United States Patent [19]

Hashimoto et al.

[11] Patent Number: 4,742,786
[45] Date of Patent: May 10, 1988

[54] DATA PROCESSING SYSTEM FOR SEWING MACHINE

[75] Inventors: Miho Hashimoto; Masaaki Yokoe; Yoshikazu Kurono; Koji Hayashi, all of Nagoya, Japan

[73] Assignee: Brother Kogyo Kabushiki Kaisha, Nagoya, Japan

[21] Appl. No.: 932,747

[22] Filed: Nov. 18, 1986

[30] Foreign Application Priority Data

Nov. 20, 1985 [JP] Japan .............................. 60-261652
Nov. 20, 1985 [JP] Japan .............................. 60-261653

[51] Int. Cl.⁴ ............................................ D05B 21/00
[52] U.S. Cl. .............................. 112/121.12; 112/103; 112/454
[58] Field of Search ............... 112/121.12, 266.1, 102, 112/103, 262.3, 454, 445, 78, 86, 98; 364/400, 470

[56] References Cited

U.S. PATENT DOCUMENTS

| | | | |
|---|---|---|---|
| 4,309,950 | 1/1982 | Franklin | 112/103 |
| 4,352,334 | 10/1982 | Childs et al. | 112/266.1 |
| 4,388,883 | 6/1983 | Hirota et al. | 112/121.12 |
| 4,388,884 | 6/1983 | Hirota et al. | 112/121.12 |
| 4,413,574 | 11/1983 | Hirota et al. | 112/121.12 |
| 4,444,135 | 4/1984 | Yanagi et al. | 112/121.12 |
| 4,520,745 | 6/1985 | Shinomiya et al. | 112/121.12 X |
| 4,622,907 | 11/1986 | Kimura | 112/121.12 |

Primary Examiner—Peter Nerbun
Attorney, Agent, or Firm—Jordan and Hamburg

[57] ABSTRACT

Herein disclosed is a data processing system for a sewing machine, which system comprises: a needle adapted to be moved upward and downward; holding means for holding a material to be stitched; and means for causing a relative movement between said needle and said holding means on the basis of a pattern data indicating a positional relationship therebetween. The data processing system further comprises: first memory means stored with a plurality of unit pattern data related to said relative movement for forming a stitching pattern respectively; pattern selecting means for selecting at least one of stitching pattern from said first memory means; second memory means for storing said selected unit pattern data; designating means for designating a plurality of points on a desired curve; standard line determining means for determining a standard line passing through the plural points designated by said designating means; and computing means for correcting said selected unit pattern data so as to form the stitching pattern, which is stored in said second memory means, along the standard line determine.

15 Claims, 8 Drawing Sheets

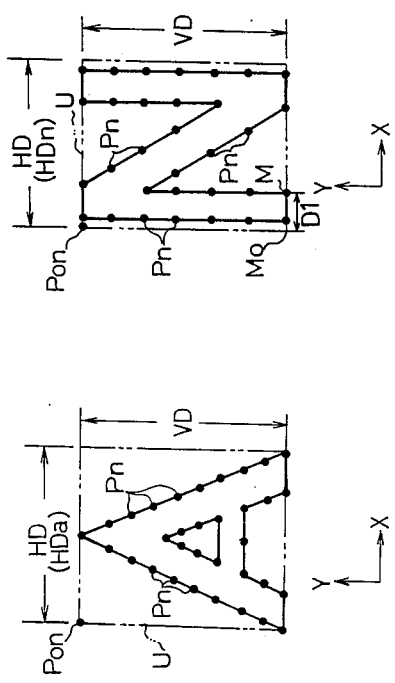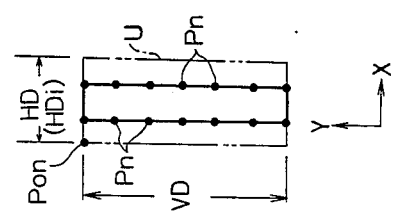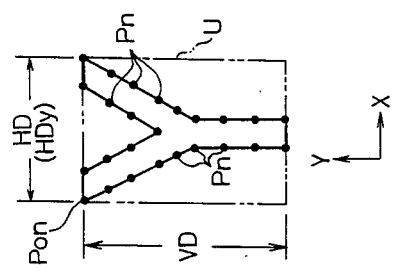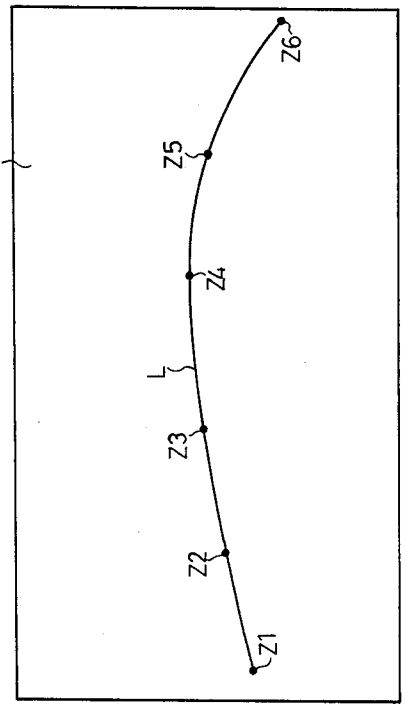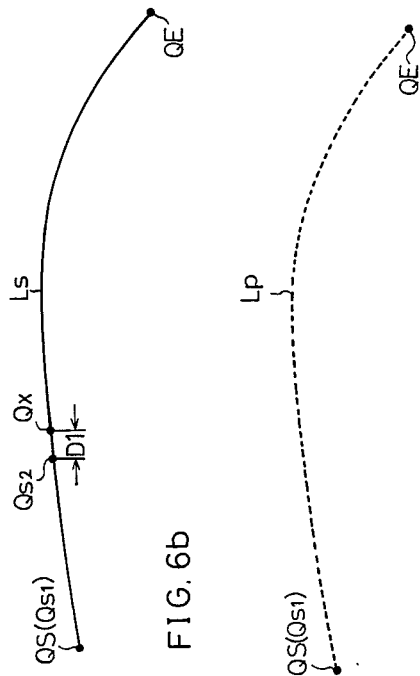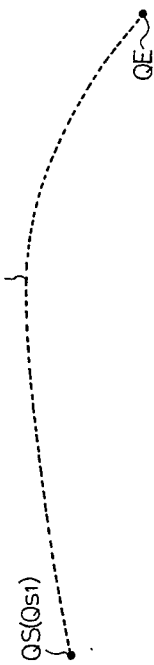

DATA PROCESSING SYSTEM FOR SEWING MACHINE

BACKGROUND OF THE INVENTION

1. Field of the Invention

The present invention relates to a data processing system for a sewing machine and, more particularly, to a data processing system which enables a plurality of selected characters such as letters or symbols to be stitched on a material along a desired curve.

2. Description of the Prior Art

The embroidery of stitching characters such as letters or symbols on work fabric by a sewing machine is well known in the art, as has been proposed U.S. Pat. Nos. 4,413,574, 4,309,950 and 4,352,334, for example. In the embroidery disclosed, the operator first selects the characters to be stitched. In accordance with this selection, the machine control system reads out the pattern data of the selected character from the pattern data which are stored in advance in a memory, and moves work fabric holding means and a needle relative to each other in accordance with the read-out pattern data to stitch the selected character on the work fabric.

In the U.S. Pat. No. 4,413,574, more specifically, there is disclosed an automatic sewing machine in which the pattern data of a character are stored in a predetermined form in a memory and used to magnify or reduce the sizes of the individual characters or to arrange the characters along a predetermined straight line and stitch them on the work fabric. In the sewing machine disclosed in the U.S. Pat. No. 4,309,950, on the other hand, a desired stitch pattern can be shared and formed symmetrically with respect to a predetermined point. The prior art of determining the position of the characters to be stitched is disclosed in the in U.S. Pat. No. 4,352,334 which was assigned to Merco Industries Incorporated. What is disclosed by this patent is merely to stitch the characters along a predetermined arc. And, the operator has to select a diameter of the arc.

As described above, the device of that patent can stitch the characters along a selected arc but not along a variable curve. This raises a problem that the application of the resultant embroidery is limited.

In the U.S. Pat. No. 4,444,135, on the other hand, there is disclosed not an invention relating to the sewing machine but a program system for forming stitches along such a variable curve as can be selected by the worker. This program system cannot make the program of a stitch pattern along the aforementioned curve.

SUMMARY OF THE INVENTION

An object of the present invention is to provide a data processing system for a sewing machine, which can stitch characters along any arbitrary curve even other than an arc.

In order to achieve the above-specified object, according to a first aspect of the present invention, there is provided a data processing system for a sewing machine, comprising: a needle adapted to be moved upward and downward; holding means for holding a material to be stitched; and means for causing a relative movement between said needle and said holding means on the basis of a pattern data indicating a positional relationship therebetween, wherein the improvement comprises: first memory means stored with a plurality of unit pattern data related to said relative movement for forming a stitching pattern respectively; pattern selecting means for selecting at least one of stitching pattern from said first memory means; second memory means for storing said selected unit pattern data; designating means for designating a plurality of points on a desired curve; standard line determining means for determining a standard line passing through the plural points designated by said designating means; and computing means for correcting said selected unit pattern data so as to form the stitching pattern, which is stored in said second memory means, along the standard line determined.

According to a second aspect of the present invention, there is provided a data processing system for a sewing machine, comprising: a needle adapted to be moved upward and downward; holding means for holding a material to be stitched; and means for causing a relative movement between said needle and said holding means on the basis of a pattern data indicating a positional relationship therebetween, wherein the improvement comprises: first memory means stored with a plurality of unit pattern data related to said relative movement for forming a stitching pattern respectively; pattern selecting means for selecting at least one of stitching pattern from said first memory means; second memory means for storing said selected unit pattern data; designating means for designating a plurality of points on a desired curve; standard line determining means for determining a standard line passing through the plural points designated by said designating means; setting means for setting the basic points of the selected stitching patterns stored in said second memory means so that said stitching patterns are individually positioned along said standard line; and means for rotating said unit pattern around said basic point data so that said stitching patterns are positioned in a direction substantially perpendicular to said standard line.

According to a third aspect of the present invention, there is provided a data processing system for a sewing machine, comprising: a needle adapted to be moved upward and downward; holding means for holding a material to be stitched; and means for causing a relative movement between said needle and said holding means in two axial directions intersecting each other in a horizontal plane, on the basis of a pattern data indicating a positional relationship therebetween, wherein the improvement comprises: first memory means stored with a plurality of unit pattern data related to said relative movement for forming a stitching pattern respectively and a plurality of polygonal fundamental block data relative to said stitching pattern, each of said block determined by said plurality of polygonal fundamental block data containing said stiching pattern determined by said unit pattern data therein; pattern selecting means for selecting at least one of stitching pattern from said first memory means; second memory means for storing said selected unit pattern data; designating means for designating a plurality of points on a desired curve; standard line determining means for determining a standard line passing through the plural points designated by said designating means; setting means for setting the starting points and end points of said fundamental blocks on said standard line on the basis of the fundamental data corresponding to the stitching pattern stored in said second memory means; and means for computing the angles, at which segments joining said starting points and said end points compose one direction of said relative movement, and for rotating the individual ones of said pattern data.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 4(a) is an explanatory diagram for explaining the mode of the data of a stitch pattern "A";

FIG. 4(b) is an explanatory diagram for explaining the mode of the data of a stitch pattern "N";

FIG. 4(c) is an explanatory diagram for explaining the mode of the data of a stitch pattern "I";

FIG. 4(d) is an explanatory diagram for explaining the mode of the data of a stitch pattern "Y";

FIG. 5 is a front elevation showing a sheet of paper for explaining the manner how a standard line is to be set from a curve drawn on the paper;

FIG. 6(a) is an explanatory view for explaining the standard line;

FIG. 6(b) is a view for explaining a point sequence of the standard line;

DESCRIPTION OF THE PREFERRED EMBODIMENTS

A first embodiment in which the present invention is embodied in an automatic sewing machine will be described in the following with reference to the accompanying drawings.

Figure 1:
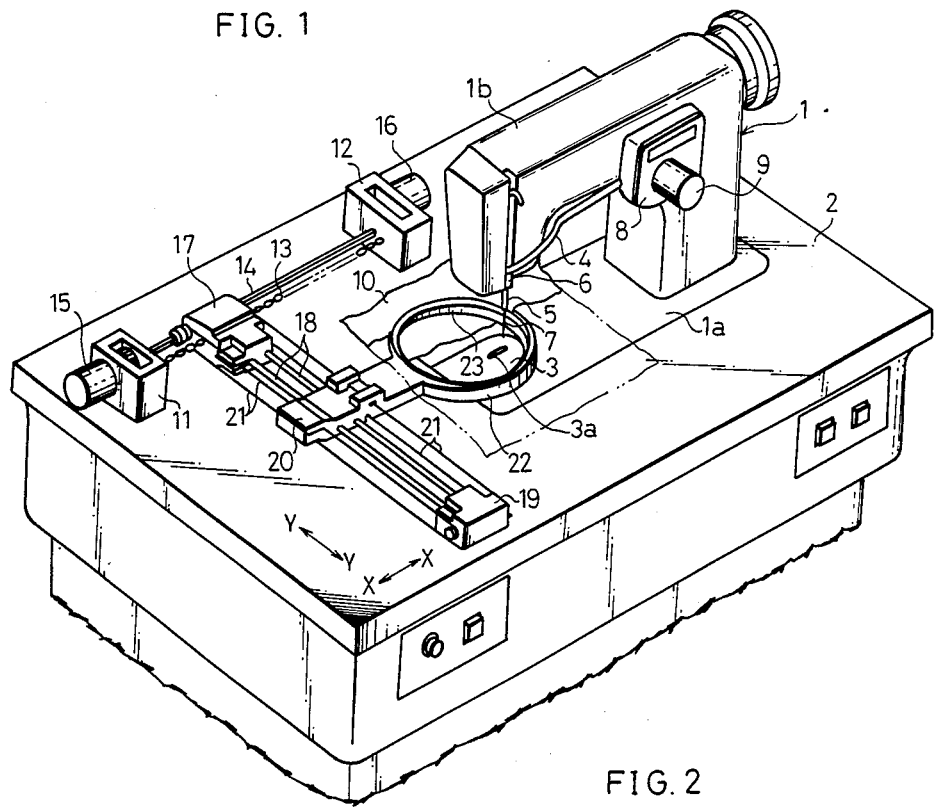
FIG. 1 is a perspective view showing the whole construction of an automatic sewing machine embodying the present invention.

In FIG. 1, a machine body 1 is placed on a machine table 2 such that a throat plate 3 is fitted on its bed 1a. The throat plate 3 is formed with a needle aperture 3a generally at its center. In the lower end of the arm 1b of the machine body 1, on the other hand, there is fitted a needle bar 5 which is connected to a rocking lever 4. A needle 7 is carried on that needle bar 5 through a needle bar connecting stud 6. On the front of the arm 1b, there is mounted an adjusting mechanism 8 for adjusting the rocking motion of the rocking lever 4. A rocking pulse motor 9 is operatively connected to that adjusting mechanism 8 so as to set the rocking motion.

In response to the vertical motions of the needle bar 5 and the rocking motions of the rocking lever 4 according to the rotations of a main shaft (although not shown), moreover, the needle 7 is associated with the not-shown loop taker in the machine body 1 to form zigzag lock stitches in the transverse (i.e., X-axis) direction on work fabric 10 or the like.

At the back of the machine table 2, there are fixed a pair of right and left mounting frames 11 and 12 which are arranged at a predetermined spacing. A feed screw 13 and a rotation transmission shaft 14 are rotatably arranged between those two frames 11 and 12. On one mounting frame 11, there is mounted an X-axis pulse motor 15 for rotationally driving the aforementioned feed screw 13 through a gear mechanism. On the other mounting frame 12, there is mounted a Y-axis pulse motor 16 for rotationally driving the aforementioned rotation transmission shaft 14.

On the aforementioned feed screw 13, there is fitted and borne an X-axis carriage 17 which is made movable in the axial direction of the screw 13. This X-axis carriage 17 carries guide pipes 18 which extend at a right angle with respect to the rotation transmission shaft 14. Moreover, a front support 19 is attached to the leading end portions of the guide pipes 18.

On these guide pipes 18, there are fitted and borne a Y-axis carriage 20 which is made movable in the axial direction of the guide pipes 18. This Y-axis carriage 20 is fixed to portions of paired connecting wires 21 which in turn are connected to the aforementioned rotation transmission shaft 14. That Y-axis carriage 20 is equipped with an embroidery frame 22 which acts as holding means associated with an inner frame 23 for holding the work fabric 10 as material.

As a result, the embroidery frame 22 for holding the work fabric 10 is moved in the X-axis direction through the aforementioned feed screw 13 by the rotational drive of the aforementioned X-axis pulse motor 15. On the other hand, the embroidery frame 22 is moved in the Y-axis direction perpendicular to the aforementioned X-axis direction by the rotational drive of the aforementioned Y-axis pulse motor 16 through the aforementioned rotation transmission shaft 14, connecting wires 21 and Y-axis carriage 20.

Figure 2:
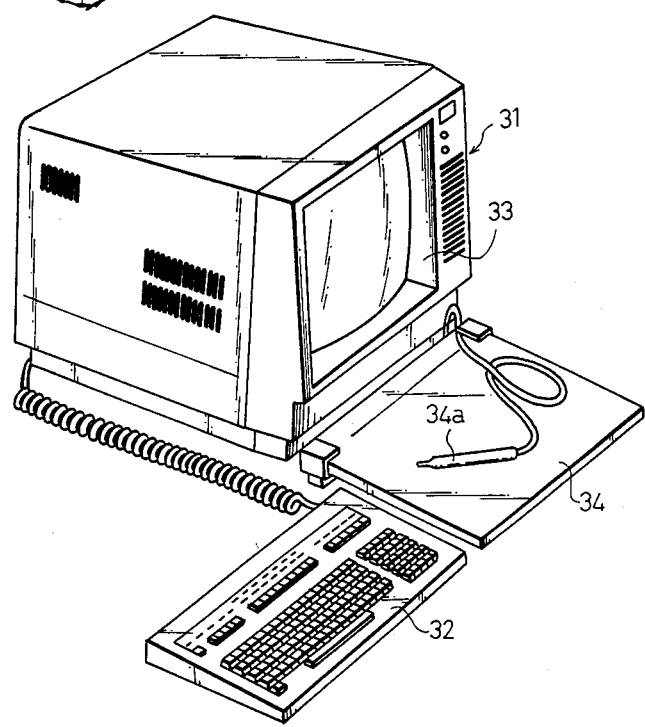
FIG. 2 is also a perspective view showing a data processing system.

The automatic sewing machine is equipped with a data processing system 31, as shown in FIG. 2. This data processing system 31 is constructed of a keyboard 32, a display unit 33 and a digitizer 34 and made operative to process data for controlling the drives of the aforementioned rocking pulse motor 9, X-axis pulse motor 15 and Y-axis pulse motor 16 to form a desired stitch pattern on the work fabric 10.

Figure 3:
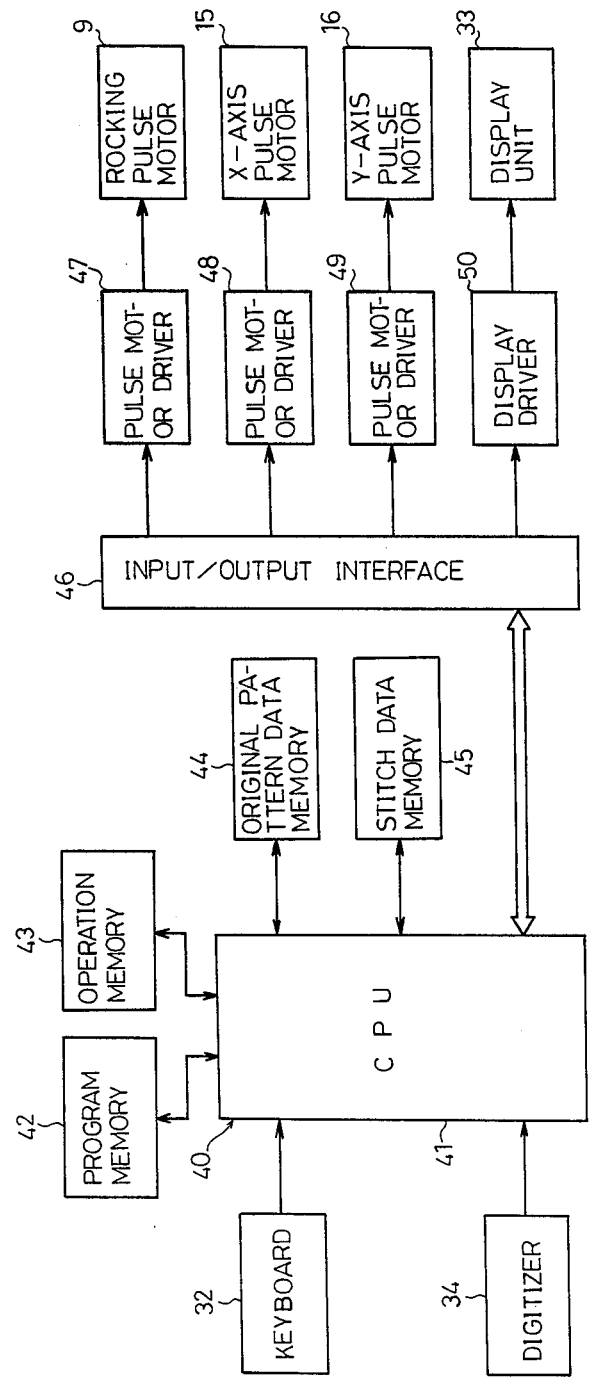
FIG. 3 is an electric block diagram showing the data processing system.

Next, the electric structure of the data processing system 31 will be described with reference to FIG. 3.

A microcomputer 40 is constructed of a central processing unit (which will be abbreviated to "CPU") 41, a program memory 42 composed of a read only memory (i.e., ROM) for storing a control program, and an operation memory 43 composed a random access memory (i.e., RAM) for temporarily storing the computing result or the like of the CPU 41. This CPU 41 conducts the processing operations or processes stitching data for forming a variety of stitch pattern on the work fabric 10 in accordance with the control program stored in the aforementioned program memory 42.

The CPU 41 is connected with the aforementioned key board 32 and digitizer 34 to receive both a key input signal based on the individual key operations of the keyboard 32 and a coordinate read signal based on the pen operation of the digitizer 34.

The CPU 41 is further connected with both an original pattern data memory 44 acting as first memory means and a stitch data memory 45. The original pattern data memory 44 is stored with both such an unit pattern data of each stitch pattern as indicates the relative positions of the aforementioned needle 7 and the embroidery frame 22 and a fundamental data of each embroidery pattern.

The aforementioned unit pattern data is a group of relative data indicating the apex (i.e., the relative position) of each portion dividing each letter such as "A", "N", "I" or "Y" to be stitched into plural sections. In each relative data group, as shown in FIGS. 4(a) to 4(d), each apex is determined as the incremental data starting in the X and Y directions from an original point Pon.

On the other hand, the aforementioned fundamental block data is composed of horizontal data HD and vertical data VD indicating the range which is occupied on the work fabric 10 by each stitch pattern when this pattern is to be stitched on the work fabric 10. As shown in FIGS. 4(a) to 4(d), in a rectangular region U used as a fundamental block to contain each needle drop point Pn for forming a stitch pattern dictated by the aforementioned pattern data, the horizontal data HD is defined to indicate the sizes HDa, HDn, HDi and HDy taken in the X-axis direction by using the aforementioned stitch original point Pon as the starting point, whereas the vertical data VD is defined to indicate the sizes in the Y-axis direction. Moreover, the fundamental data composed of those horizontal data HD and vertical data VD is prepared for each of the aforementioned pattern data and stored in the original pattern data memory 44.

Incidentally, the details of those pattern data and fundamental data will be easily understood with reference to the U.S. Pat. Nos. 4,388,884 and 4,388,883 belonging to the applicant common with the present invention.

The aforementioned stitch data memory 45 is stored with stitch data which are processed by the present data processing system 31 for forming a variety of stitch patterns on the work fabric 10. On the basis of these stitch data, moreover, the CPU 41 outputs drive control signals to individual pulse motor drivers 47 to 49 through an input/output interface 46 to drive and control the aforementioned pulse motors 9, 15 and 16, respectively.

In addition, the CPU 41 outputs a display control signal to a display driver 50 through the interface 46 to cause the aforementioned display unit 33 to make a display.

Next, the stitch data processing function owned by the aforementioned data processing unit 31 will be described in the following.

First of all, as shown in FIG. 5, the operator sets the digitizer 34 with a sheet of paper 51 in which a desired curve L for stitching the aforementioned pattern therealong is drawn. Then, the operator designates at least three or more arbitrary points (e.g., six points Z1 to Z6 in the present embodiment) on the aforementioned curve L with the pen 34a of the digitizer 34. On the basis of these designations, the digitizer 34 outputs the position data indicating the points Z1 to Z6 to the CPU 41. At this time, this CPU 41 temporarily stores (at a step 1) the operation memory 43 with the coordinate data of the designation points Z1 to Z6 designated on the basis of the pen operations. And, this step 1 constitutes the designating means.

When the designating of the points Z1 to Z6 is ended, the CPU 41 computes a curve, which smoothly joins those six designated points Z1 to Z6 on the basis of the position data of the points Z1 to Z6, with a spline function in the present embodiment and determines that curve as a standard line Ls (at a step 2). And, this step 2 constitutes standard line determining means. The standard line Ls determined by using the spline function is similar to the curve L drawn on the paper 51, although it may become different depending upon the number of the designating points. Incidentally, the standard line Ls is determined in the present embodiment by using the spline function, but may be determined with a function of higher order.

Next, the CPU 41 divides the standard line Ls at a minimum movement unit of the aforementioned embroidery frame 22 into a sequence of fine points Lp (as shown in FIG. 6(b)). Then, the CPU 41 causes the data of the individual points of the point sequence Lp to be stored in the operation memory 43 (at a step 3).

Next, the operator operates the keys of the keyboard 32 to designate a plurality of stitch patterns to be made. In response to these key operations, the keyboard 32 outputs a pattern selection signal to the CPU 41. In response to this pattern selection signal, the CPU 41 causes the data (i.e., the data of the stitch patterns of the individual four letters "A", "N", "I" and "Y" in the present embodiment) of the stitch patterns designated to be temporarily stored in the operation memory 43 in the designated order (at a step 4). And, this step 4 constitutes second memory means.

Next, the CPU 41 proceeds the program to a step of setting the starting point and end point of the fundamental block of each stitch pattern. The CPU 41 determines the starting point QS of the aforementioned standard line Ls as the first stitch pattern in the array of the stitch pattern, i.e., the starting point Qs1 of the fundamental block of the letter "A" (at a step 5). Then, the CPU 41 reads out the horizontal data HD of the fundamental data of the letter "A" from the original pattern data memory 44 to locate that point on the aforementioned point sequence Lp, which is at a distance equal to the horizontal data HD (=HDa) from the starting point Qs1 thereby determine that point as the end point Qe1 of the fundamental block (at a step 6).

Figure 7A:
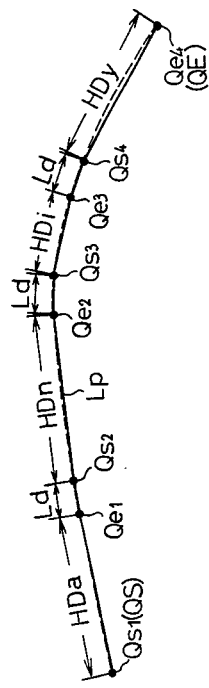
FIG. 7(a) is an explanatory view showing the starting point and end point of fundamental block of each stitch pattern on the standard line composed of point sequence.

Next, the CPU 41 judges whether or not all the end points of the fundamental blocks of the stitch patterns stored in the second memory means have been determined (at a step 7). If NO, the CPU 41 uses this end point Qe1 as a starting point Qs2 of the next letter "N" (at a step 8) to determine the end point Qe2 of the same letter "N" like the above on the basis of the horizontal data HD (=HDn) of the same "N". Likewise, the CPU 41 the starting points Qs3 and Qs4 and end points Qe3 and Qe4 of the letters "I" and "Y", as shown in FIG. 7(a), with reference to the end point of the preceding stitch patterns (at the steps 6 to 8). And, these steps 6 to 8 constitute setting means.

When the starting points and end points of the respective stitch patterns "A", "N", "I" and "Y" are determined, the CPU 41 computes the distance Lz between the end point Qe4 of the aforementioned stitch pattern "Y" and the terminal end QE of the point sequence Lp (at a step 9). Subsequently, the CPU 41 determines the value, which is computed by dividing that computed distance Lz by the difference between the number m of the stitch patterns and the number 1 (i.e., 3 because of the four stitch patterns in the present embodiment), as a discrete gap Ld (=Lz/(m−1)) (at a step 10). And, these steps 9 and 10 constitute gap setting means.

Figure 7B:
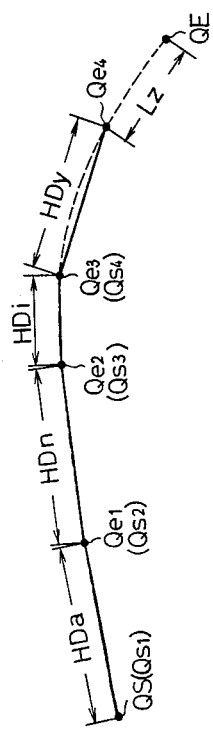
FIG. 7(b) is an explanatory view showing the final starting point and end final point of each fundamental block of stitch pattern on the standard line composed of point sequence including discrete gaps.

When the discrete gap Ld is determined, the CPU 41 conducts a process for stitching the respective patterns "A", "N", "I" and "Y" at a spacing of the discrete gap Ld. At first, the CPU 41 determines such a point on the point sequence Lp as is spaced at the discrete gap Ld from the end point Qe1 on the point sequence Lp of the aforementioned stitch pattern "A", as shown in FIG. 7(b), and uses that point as the actual (or final) starting point Qs2 of the stitch pattern "N". Then, the CPU 41 determines an actual (or final) end point Qe2 with reference to that starting point Qs2. Likewise, the CPU 41 sequentially determines the actual (or final) starting points Qs3 and Qs4 and end points Qe3 and Qe4 of the stitch patterns "I" and "Y" with reference to the end points of the preceding stitch patterns (at a step 11). And, this step 11 constitutes computing means and relocating means.

Figure 7C:
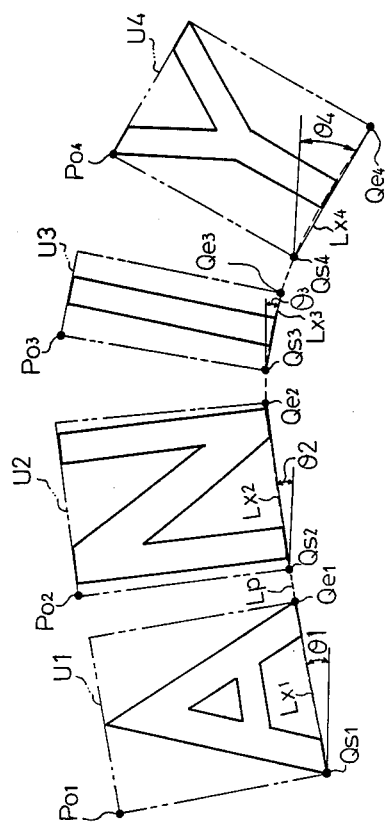
FIG. 7(c) is an explanatory view showing the state in which each stitch pattern is arranged on the standard line composed of point sequence.
Figure 8:
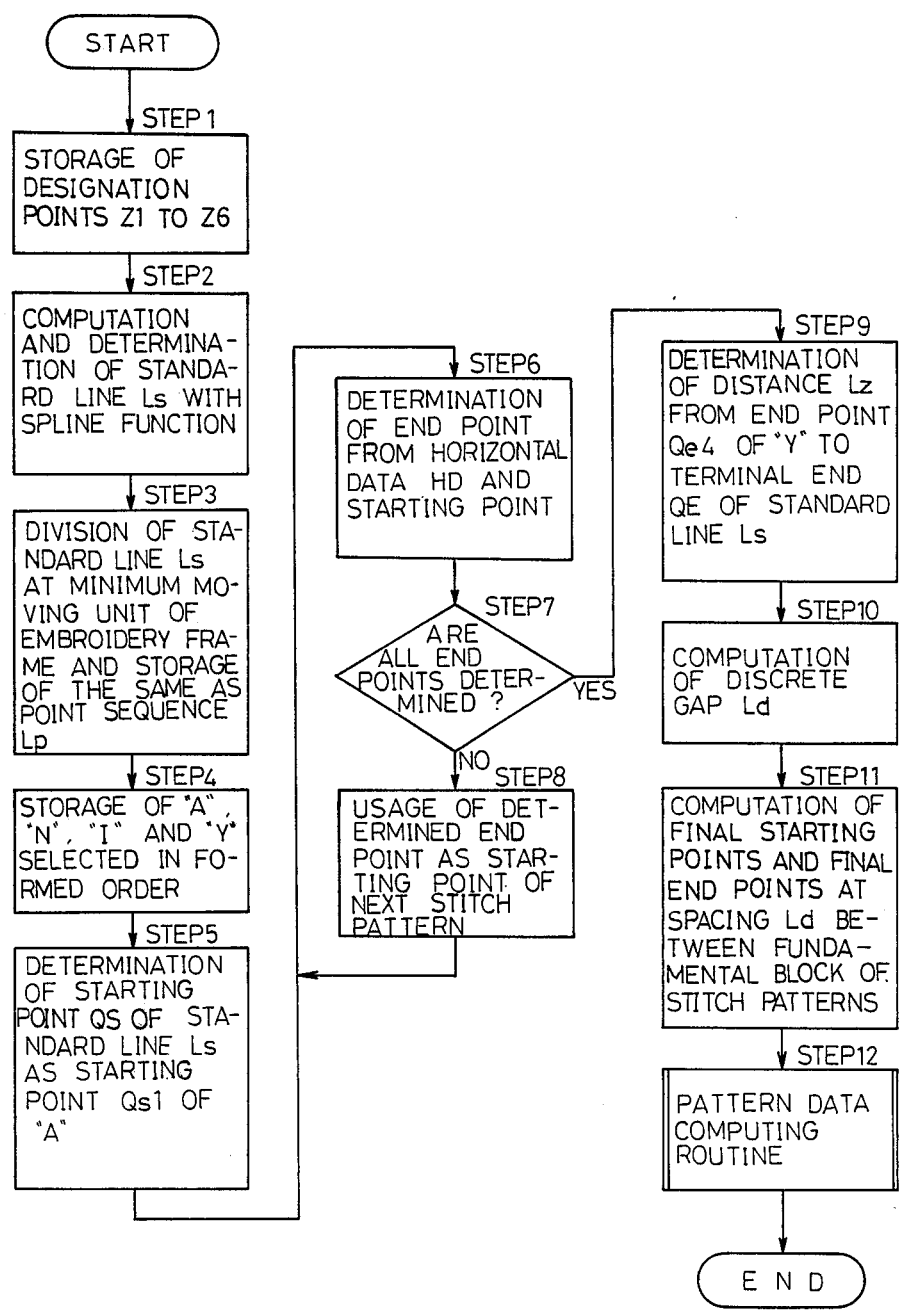
FIG. 8 is a flow chart showing the operations of a central processing unit.

When the final starting points and end points of the respective stitch patterns "A", "N", "I" and "Y" are determined, the CPU 41 executes the pattern data computation processing operations of these respective stitch patterns (at a step 12). In these computation processing operations, the CPU 41 is set to use the two apexes, which define the base of the fundamental block of each stitch pattern, as the starting and end points. As shown in FIG. 7(c), the CPU 41 determines first a straight line Lx1 joining the starting point Qs1 and end point Qe1 and then an angle θ1 at which the straight line Lx1 determined is inclined with respect to the X-axis direction.

Next, the CPU reads out the unit pattern data of the pattern "A" from the original pattern data memory 44 and executes a coordinate transformation in which the pattern data (i.e., the relative position data) are rotated at the determined angle θ1 around said final starting point Qs1 as basic point. The CPU 41 determines the point, which lies on a straight line perpendicular to the aforementioned straight line Lx1 and is spaced at the same distance as the vertical data VD from the starting point Qs1, as the stitch origin Po1. Likewise, the CPU 41 determines the point, which is at a distance equal to that of the vertical data VD from the end point Qe1, as the remaining apex of a region U1 and stores it in the stitch data memory 45.

Next, for the patterns "N", "I" and "Y", the CPU 41 likewise determines straight lines Lx2 to Lx4 and angles θ2 to θ4, rotates the patterns by the angles θ2 to θ4 around said final starting point Qs2 to Qs4, respectively, and determines the stitch originals Po2 to Po4 and the remaining apexes of regions U2 to U4 thereby to prepare the respective stitch data of the stitch patterns. And, these processing operations constitute rotating means.

When the data processing of the pattern "Y" is completed, moreover, the CPU 41 ends the stitch data processing of all the stitch patterns selected.

As a result, the pattern data and so on of the respective stitch patterns "N", "I" and "Y" are turned, as shown in FIG. 7(c), around their starting points Qs2, Qs3 and Qs4 to have their coordinates transformed, so that they are stored in the stitch data memory 45 as the stitch data for forming the respective stitch patterns "A", "N", "I" and "Y" at a spacing of the discrete gap Ld and along the standard line Ls.

After this, the operator starts the automatic sewing machine. Then, the aforementioned respective pulse motors 9, 15 and 16 are driven and controlled on the basis of the stitch data stored in the stitch data memory 45 so that the work fabric 10 is formed with the stitches whose patterns are arrayed along the standard line Ls and at the constant discrete gap Ld all over the range of the standard line Ls.

Thus, according to the present embodiment, by designating an arbitrary number of designation points, it is possible to easily set a desired curve, i.e., the standard line Ls and to remarkably easily form the work fabric 10 with the stitches whose patterns are arrayed along the standard line Ls and at the constant discrete gap Ld all over the range of the standard line Ls.

Next, a second embodiment of the present invention will be described in the following with reference to FIGS. 9 and 10.

According to the foregoing first embodiment, the discrete gap Ld is determined by merely dividing the distance Lz between the end point Qe4 and the terminal end QE of the point sequence Lp by the difference between the number m of the stitch patterns and the number 1. According to the second embodiment, on the other hand, as shown in FIGS. 4(a) to 4(d), noting that the sizes of the horizontal data HD of the fundamental block are different among the individual stitch patterns, the discrete gap is to be determined by adding the elements of the different horizontal data HD. Therefore, the second embodiment is different in that point from the foregoing first embodiment so that the description to be made is limited to that difference while omitting the remainder.

Now, at the end of the aforementioned step 9 of determining the distance Lz, the CPU 41 reads out the respective horizontal data HD of the patterns "A", "N", "I" and "Y", i.e., the horizontal data HDa, HDn, HDi and HDy to determine the total sum T (=HDa+HDn+HDi+HDy) (at a step A).

Next, the gaps Ld1 to Ld4 to be shared among the respective stitch patterns are determined from the following computing equations from the aforementioned total sum T, respective horizontal data HDa, HDn, HDi and HDy and distance Lz (at a step B):

$Ld1 = Lz \cdot HDa/T;$ $Ld2 = Lz \cdot HDn/T;$ $Ld3 = Lz \cdot HDi/T;$ and $Ld4 = Lz \cdot HDy/T.$ Next, the CPU 41 proceeds its program to processing operations for determining the final starting points Qs1 to Qs4 and final end points Qe1 to Qe4 of the respective stitch patterns on the basis of the above-specified computing results (at steps C and D).

At first, the CPU 41 determines such a point on the point sequence Lp as is spaced at a distance ($=Ld1/2$) of one half of the shared gap Ld1 of the pattern "A" from the starting end QS of the point sequence Lp, and uses the determined point as the final starting point Qs1 (at the step C). After this, the CPU 41 determines first the end point Qe1 by a method similar to that of the foregoing embodiment on the basis of that starting point Qs1 and then the final starting point Qs2 and final end point Qe2 of the pattern "N". This starting point Qs2 of the pattern "N" is determined as such a point on the point sequence Lp as is spaced at a distance ($=(Ld1+Ld2)/2$) of one half of the total sum of the gaps Ld1 and Ld2 shared between the patterns "A" and "N" from the aforementioned final end point Qe1 of the pattern "A".

Likewise, the final starting point Qs3 of the pattern "I" is determined as such a point on the point sequence Lp as is spaced at a distance ($=(Ld2+Ld3)/2$) of one half of the total sum of the gaps Ld2 and Ld3 shared between the patterns "N" and "I" from the final end point Qe2 of the pattern "N", and the final starting point Qs4 of the pattern "Y" is determined as such a point on the point sequence Lp as is spaced at a distance ($=(Ld3+Ld4)/2$) of one half of the total sum of the gaps Ld3 and Ld4 shared between the patterns "I" and "Y" from the final end point Qe3 of the pattern "I". Of course, the final end points Qe3 and Qe4 are determined in a manner like the aforementioned one with reference to the respectively corresponding starting points Qs3 and Qs4 (at the step D).

When the respective final starting points and final end points of the stitch patterns "A", "N", "I" and "Y" are determined, the CPU 41 executes the pattern data computing operations of those respective stitch patterns (at a step E). Incidentally, these processing operations are similar to those of the step 12 of the foregoing first embodiment, and their detailed descriptions are accordingly omitted.

Figure 9:
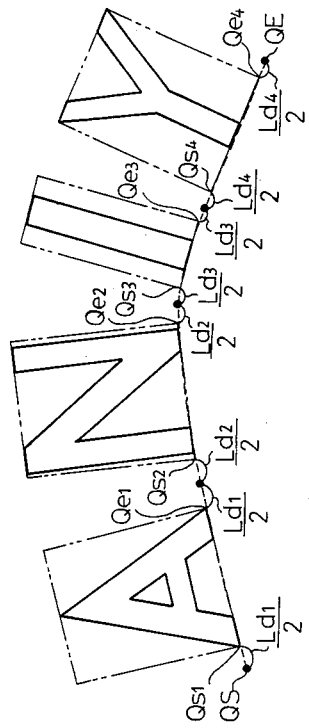
FIG. 9 is an explanatory view showing the state in which each stitch pattern is arranged on the standard line composed of point sequence so as to explain a second embodiment of the present invention.
Figure 10:
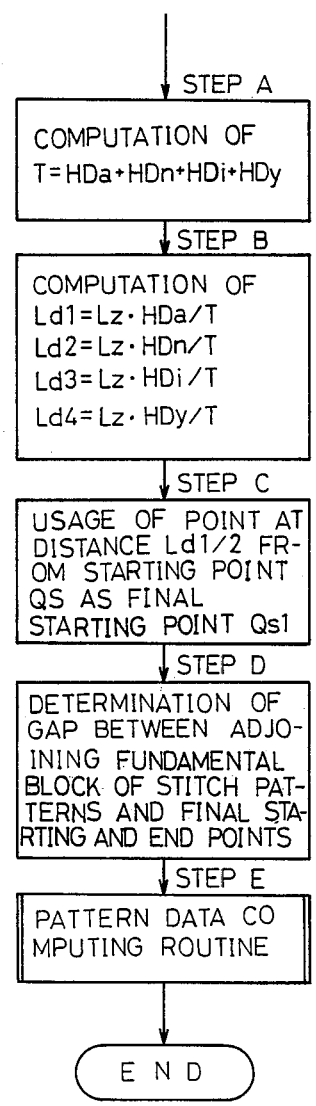
FIG. 10 is a flow chart showing the operations of the central processing unit so as to explain the second embodiment of the present invention.

As a result, the respective pattern data and so on of the stitch patterns "A", "N", "I" and "Y" are rotated, as shown in FIG. 9, with respect to their starting points Qs1, Qs2, Qs3 and Qs4 to have their coordinate transformed, and are stored in the stitch data memory 45 as the stitch data for forming the respective stitch patterns "A", "N", "I" and "Y" at predetermined spacings corresponding to the sizes of the respective stitch patterns and along the standard line Ls.

Thus, in the present embodiment, the array gaps of the stitch patterns at predetermined spacings corresponding to the sizes of the respective stitch patterns are determined so that totally balanced stitch patterns can be arrayed and stitched on the work fabric 10.

Incidentally, in the foregoing respective embodiments, the data are processed in the order of the stitch patterns selected from the starting point QS of the point sequence Lp. For an arbitrary point, an arbitrary stitch pattern can be designated to process the data for determining the stitch patterns before and after the designated one.

In the foregoing embodiment, for example, in case a point M on the lower side (base) of the region U of the stitch pattern "N", as shown in FIG. 4(b), comes to the position of an arbitrary point Qx on the standard line Ls, as shown in FIG. 6(a), the data is processed along the standard line Lz at a predetermined gap between the individual stitch patterns with respect to the point M, as will be described in the following.

The CPU 41 determines first the distance D1 between the point M on the lower side of the aforementioned region (i.e., the fundamental block) U and the point Mo at the left end of the same lower side and then such a point on the point sequence Lp as is at a spacing equal to the distance D1 from the point Qx, as shown in FIG. 6(a), and then that point as starting point Qs2 of the stitch pattern "N".

Then, the CPU 41 determines the starting point and end point of another stitch pattern on the basis of that starting point Qs2.

More specifically, the CPU 41 determines the stitch patterns "I" and "Y" accompanying the pattern "N" by processing operations similar to those of the steps 9 to 12. For the stitch pattern "A" preceding the pattern "N", the starting point Qs2 of the pattern "N" is used as the end point Qe1 of the pattern "A", from which the starting point Qs1 is determined.

When the aforementioned individual points are determined, the CPU 41 conducts the processing operations for arraying other stitch patterns at a predetermined gap with reference to the stitch pattern "N". In this case, the gapping method described in the foregoing first embodiment and the gap determining method described in the second embodiment are considerable.

In the case of the method of the first embodiment, the distance of the starting point Qs1 of the pattern "A" and the starting point QS of the point sequence Lp and the distance between the end point Qe4 of the pattern "Y" and the terminal end QE of the point sequence LP are determined. Then, the CPU 41 divides the former distance by the number of the preceding stitche patterns with reference to the pattern "N" to use the quotient as the front discrete gap and divides the latter distance by the number of the trailing stitche patterns with reference to the pattern "N" to use the quotient as the rear discrete gap.

Then, the CPU 41 determines the final starting point and final end point of each stitch pattern by a method similar to the foregoing one on the basis of the front and rear discrete gaps determined, thus processing the data.

According to the method of the second embodiment, on the other hand, the aforementioned two distances are used to determine the individual gaps by a method similar to the foregoing one by using the respective width data HD.

Incidentally, although the methods for opening the various gaps have been described in the aforementioned individual embodiments, the present invention should not be limited thereto. In short, the distance between the terminal end of the standard line and the end point of a stitch pattern may be determined to determine the gap on the basis of that distance.

The gap between the stitch pattern may be set on the basis of both the total length of the standard line and the total sum of the lengths taken along the standard line within the range owned by each stitch pattern.

Incidentally, in the embodiments of the present invention, the pattern data express the stitch pattern with the apexes of a plurality of polygonal portions, and the each apex is of the type of incremental data but may be of another type. For example, the pattern data may be relative coordinate data indicating all the needle drop points with respect to the origin. In other words, the present invention should have no restriction on the type of pattern data.

Figure 11A:
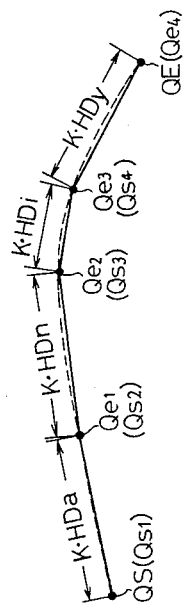
FIG. 11(a) is an explanatory view showing the starting point and end point of each fundamental block of stitch pattern on the standard line composed of point sequence so as to explain a third embodiment of the present invention.
Figure 11B:
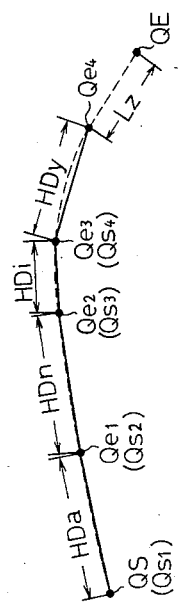
FIG. 11(b) is an explanatory view showing the final starting point and final end point of each fundamental block of enlarged stitch pattern on the standard line composed of point sequence so as to explain the third embodiment of the present invention.

Next, a third embodiment of the present invention will be described in the following with reference to FIGS. 11 and 12.

In the aforementioned individual embodiments, the predetermined gaps are established to form the stitch patterns. In the present embodiment, each stitch pattern is enlarged at a constant enlargement ratio and is formed all over the range of the standard line Ls.

As a result, the present embodiment is similar to the first embodiment up to the processing operations (i.e., the steps 1 to 9) for determining the distance Lz to the terminal end QE, and the following description is limited to the different steps 9 and later.

When the distance Lz is computed at the step 9, the CPU 41 computes the enlargement ratio K in the following manner from the computed distance Lz and the respective horizontal data HD of the aforementioned selected patterns "A", "N", "I" and "Y" (at a step $\alpha$). Now, if the horizontal data HD of the patterns "A", "N", "I" and "Y" are designated at HDa, HDn, HDi and HDy, respectively, then:

$T = HDa + HDn + HDi + HDy$; and $K = (T + Lz)/T$.

And, these steps 9 and $\alpha$ constitute enlargement ratio computing means.

When the enlargement ratio K is computed, the CPU 41 multiplies the horizontal data HD of the patterns "A", "N", "I" and "Y", i.e., the values of the fundamental data in the X-axis direction at the ratio K to process and temporarily store the fundamental data of new patterns "A", "N", "I" and "Y" in the operation memory 43 (at a step $\beta$). As a result, only the horizontal data HD of those new fundamental data are enlarged at the ratio K (to K·HDa, K·HDn, K·HDi and K·HDy).

Next, the CPU 41 determines the final starting points and end points of the individual stitch patterns of the horizontal data K·HDa to K·HDn, respectively. At first, as shown in FIG. 11(b), the CPU 41 uses the final starting point Qs1 of the aforementioned stitch pattern "A" as the starting end QS of the point sequence Lp to determine such a point on the point sequence Lp, as is spaced at a distance equal to the horizontal data HD (=K·HDa) of the enlarged pattern "A" from the same starting point Qs1. Then, the CPU 41 uses that point as a new end point Qe1 of the stitch pattern "A". The CPU 41 uses that end point Qe1 as a final staring point Qs2 of the next pattern "N" to determine a final end point Qe2 of the pattern "N" on the basis of the similarly enlarged horizontal data HD (=K·HDn). Likewise, the CPU 41 sequentially determines final starting points Qs3 and Qs4 and end points Qe3 and Qe4 of the stitch patterns "I" and "Y" with reference to the final end point of the preceding stitch pattern (at a step $\gamma$).

When the final starting points and end points of the individual stitch patterns "A", "N", "I" and "Y" are determined, the CPU 41 enlarges the respective pattern data of those stitch patterns at the ratio K. As a result, the pattern data are horizontally enlarged at the ratio K only in the X-axis direction. Next, the CPU 41 executes the pattern data arithmetic processing operations on the basis of those new enlarged magnified pattern data (at a step $\delta$).

Figure 11C:
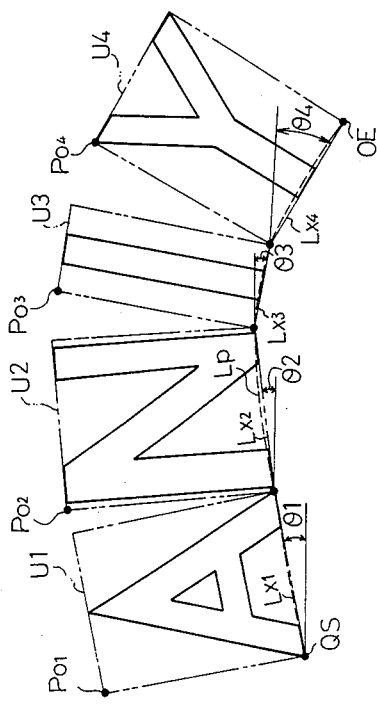
FIG. 11(c) is an explanatory view showing the state in which each enlarged stitch pattern is arranged on the standard line composed of point sequence so as to explain the third embodiment of the present invention.
Figure 12:
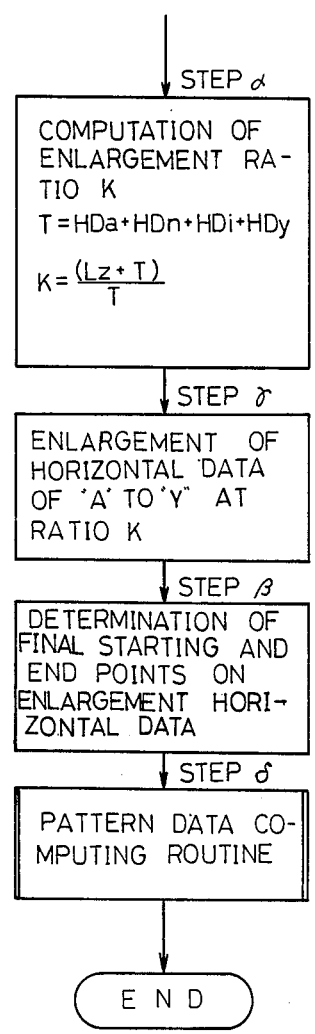
FIG. 12 is a flow chart showing the operations of the central processing unit so as to explain the third embodiment of the present invention.

In these pattern data arithmetic processing operations of the individual stitch patterns, as shown in FIG. 11(c), the CPU 41 determines first a straight line joining the determined starting point Qs1 and end point Qe1 and then an angle $\theta 1$ of the determined straight line Lx1 with respect to the X-axis direction.

Next, the CPU 41 reads out the magnified pattern data of that stitch pattern "A" from the operation memory 34. The CPU executes coordinate transformations by which the individual coordinate position data of the pattern data are rotated by the angle $\theta 1$. Next, the CPU 41 determines the stitch origin Po1 from such a point as lies on on a straight line perpendicular to the aforementioned straight line Lx1 and as is spaced at a distance equal to the vertical data VD from the starting point Qs1. Likewise, the CPU 41 determines a point spaced at a distance equal to the vertical data VD from the end point Qe1 as the remaining apex of the region U1 and stores it in the stitch data memory 45.

Next, the CPU 41 likewise determines the straight lines Lx2 to Lx4 joining the starting points and end points and the angles $\theta 2$ to $\theta 4$, rotates the enlarged pattern data at the angles $\theta 2$ to $\theta 4$, respectively, for coordinate transformations, and determines the stitch origins Po2 to Po4 and the remaining apexes of the regions U2 to U4 to process the stitch data of the individual stitch patterns. When the data processing of the pattern "Y" is finished, moreover, the CPU 41 ends its stitch data processing operations of all the stitch patterns selected.

After this, the operator starts the automatic sewing machine. Then, the individual pulse motors 9, 15 and 16 are driven and controlled on the basis of the stitch data stored in the stitch data memory 45 so that the stitch patterns arrayed and enlarged to be stitched along the standard line Ls all over the range are stitched on the work fabric 10.

Thus, according to the present embodiment, a desired curve, i.e., the standard line Ls can be easily set merely by designating an arbitrary number of designation points. Moreover, the stitch patterns arrayed and enlarged to be stitched along the standard line Ls all over the range of the line Ls can be remarkably easily stitched on the work fabric 10.

In the present embodiment, on the other hand, there are used the point sequence Lp and stitch pattern number which will allow the distance Lz to take a positive value. In case, for example, the point sequence Lp is so short or the number of the stitch patterns is so large that the stitch patterns extend over the point sequence Lp to cause the distance Lz to take a negative value, the enlargement ratio K becomes smaller than 1 (i.e., $0<K<1$) so that the stitch pattern takes a reduced shape. At this time, it is assumed that the starting point and end point of the overextended stitch pattern be located on the extension of the straight line joining the starting point and end point of the preceding stitch pattern and that the gap between the end point of the last stitch pattern on the extension and the terminal end QE of the point sequence Lp be designated at the distance Lz.

Incidentally, in the foregoing individual embodiments, the description has been made on the case in which the stitch patterns are formed transversely of one another and along the standard line Ls. Despite of this fact, however, the present invention may be practised such that the data are so processed that the stitch patterns can be arrayed in longitudinal directions relative to one another with respect to the standard line Ls.

Figure 13:
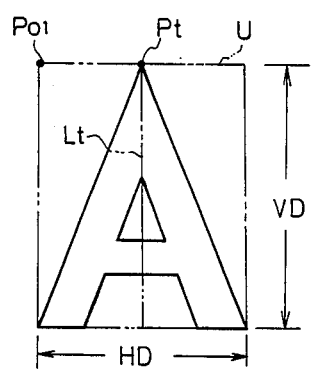
FIG. 13 is an explanatory view for explaining the mode of the data of the stitch pattern "A" so as to array the stitch pattern in a longitudinal direction.
Figure 14:
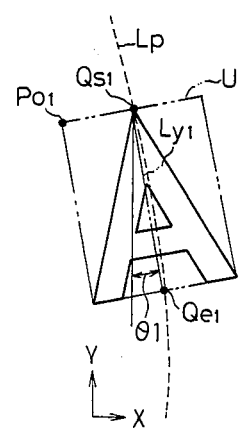
FIG. 14 is a view showing the state in which the stitch pattern is arranged longitudinally of the standard line composed of point sequence.

In case, for example, the stitch patterns are to be formed at a spacing as in the first and second embodiments, more specifically, as show in FIG. 13 and FIG. 14, the CPU 41 adjusts, in the fundamental data of the stitch pattern "A", the point of intersection Pt between a center line Lt horizontally bisecting the region U and the upper side determining the same region U to the starting point Qs1 of the point sequence Lp.

Then, the CPU 41 locates such a point on the aforementioned point sequence Lp as is spaced at a distance of the length of the center line Lt, i.e., the distance equal to the vertical data VD of the fundamental data and uses that point as the end point Qe1. Likewise the foregoing embodiments, moreover, the starting points and end points are finally determined.

Next, the CPU 41 determines first a straight line joining the determined starting point Qs1 and end point Qe1 and then the angle $\theta 1$ contained between the determined straight line Ly1 and the Y-axis direction.

Moreover, the CPU 41 subjects the pattern data to coordinate transformations on the basis of that angle and determines the stitch original point Po1 on a straight line perpendicular to the foregoing straight line Ly1 to process the stitch data. This enables to form the stitch patterns at a spacing in the vertical direction along the standard line Ls.

In case, on the other hand, the englarged stitch pattern is to be formed as in the third embodiment, the CPU 41 likewise determines first the starting point and end point of each stitch pattern and then the distance Lz to determine the enlargement ratio K from the distance Lz and the vertical data VD of each stitch pattern. The CPU 41 processes the new pattern data and fundamental data vertically enlarged at the ratio K and newly determines the individual starting points and end points on the basis of those data.

Next, the CPU 41 determines, for each stitch pattern, a straight line joining the starting point (Qs1) and the end point (Qe1) and then the angle ($\theta 1$) contained between the determined straight line (Ly1) and the Y-axis direction. If the aforementioned enlarged new pattern data are subjected to coordinate transformations on the basis of that angle and if the point spaced at a distance of one-half of the horizontal data (HD) from the starting point (Qs1) is determined as the stitch original point (Po1) to process the stitch data, it is possible to form on the work fabric 10 the stitch pattern of the enlargement ratio K, which is arrayed in the vertical direction with respect to the standard line Ls.

Although the digitizer 34 has been used in the foregoing embodiments so as to set the standard line Ls, on the other hand, the present invention should not be limited thereto but can be modified such that the standard line Ls is set by means of a light pen or the key operation of the keyboard 21, for example.

Although, moreover, the plural stitch patterns are arrayed along the standard line in the foregoing embodiments, a single stitch pattern may be formed in any position along the standard line.

As many apparently widely different embodiments of this invention may be made without departing from the spirit and scope thereof, it is to be understood that the invention is not limited to the specific embodiments thereof except as defined in the appended claims.

What is claimed is:

1. A data processing system for a sewing machine, comprising:
    a needle adapted to be moved upward and downward;
    holding means for holding a material to be stitched; and
    means for causing a relative movement between said needle and said holding means on the basis of a pattern data indicating a positional relationship therebetween,
    wherein the improvement comprises:
    first memory means for storing a plurality of unit pattern data related to said relative movement for forming stitching patterns respectively;
    pattern selecting means for selecting unit pattern data from said first memory means;
    second memory means for storing said selected unit pattern data;
    manual designating means for designating a plurality of optional points on a desired curve and generating the coordinate data related to said designated points;
    standard line determining means for determining a standard line which passes through said designated points based on said coordinate data; and
    computing means for correcting said selected unit pattern data so as to form the stitching pattern, which is stored in said second memory means, along the determined standard line.

2. A data processing system according to claim 1, wherein said desired curve is drawn on a sheet of paper.

3. A data process system according to claim 1, wherein said standard line determining means computes said standard line with a spline function.

4. A data processing system according to claim 1, wherein said standard line determining means computes said standard line with a function of higher order.

5. A data processing system according to claim 1, wherein said manual designating means comprises a light pen and a CRT.

6. A data proessing system according to claim 1, wherein said manual designating means comprises a CRT and a keyboard so that said standard line determining means computes said standard line on the basis of the coordinate data by said keyboard.

7. A data processing system for a sewing machine, comprising:
    a needle adapted to be moved upward and downward;
    holding means for holding a material to be stitched;
    means for causing a relative movement between said needle and said holding means on the basis of a pattern data indicating a positional relationship therebetween;

first memory means for storing a plurality of unit pattern data related to said relative movement for forming stitching patterns respectively;

pattern selecting means for selecting unit pattern data from said first memory means;

second memory means for storing said selected unit pattern data;

manual designating means for designating a plurality of optional points on a desired curve and generating coordinate data related to said designated points;

standard line determining means for determining a standard line which passes through said designated points based on said coordinate data;

setting means for setting basic points of the selected stitching patterns stored in said second memory means so that said stitching patterns are individually positioned along said standard line; and means for rotating said unit pattern data around said basic points so that said stitching patterns are positioned in a direction substantially perpendicular to said standard line.

8. A data processing system for a sewing machine, comprising:

a needle adatped to be moved upward and downward;

holding means for holding a material to be stitched; and mens for causing a relative movement between said needle and said holding means on the basis of a pattern data indicating a positional relationship therebetween;

first memory means for storing a plurality of unit pattern data related to said relative movement for forming a stitching pattern respectively;

pattern selecting means for selecting unit pattern data from said first memory means;

second memory means for storing said selected unit pattern data;

designating means for designating a plurality of points on a desired curve;

standard line determining means for determining a standard line passing through the plural points designated by said designating means;

setting means for setting basic points of the selected stitching patterns stored in said second memory means so that said stitching patterns are individually positioned along said standard line; and mens for rotating said unit pattern data around said basic points so that said stitching patterns are positioned in a direction substantially perpendicular to said standard line, said setting means comprising means for setting gaps between the individual ones of said stitching patterns on the basis of the total length of said standard line and the total sum of the lengths of ranges along said standard a line of the individual ones of said stitching patterns.

9. A data processing system for a sewing machine, comprising:

a needle adapted to be moved upward and downward;

holding means for holding a material to be stitched; and means for causing a relative movement between said needle and said holding means on the basis of a pattern data indicating a positional relationship therebetween;

first memory means for storing a plurality of unit pattern data related to said relative movement for forming a stitching pattern respectively;

pattern selecting means for selecting unit pattern-data from said first memory means;

second memory means for storing said selected unit pattern data;

designating means for designating a plurality of points on a desired curve;

standard line determining means for determining a standard line passing through the plural points designated by said designating means;

setting means for setting basic points of the selected stitching patterns stored in said second memory means so that said stitching patterns are individually positioned along said standard line; and means for rotating said unit pattern data around said basic points so that said stitching patterns are positioned in a direction substantially perpendicular to said standard line, said setting means comprising means for enlarging the individual ones of said stitching patterns on the basis of the total length of said standard line and the total sum of the lengths of ranges along said standard line of the individual ones of said stitching patterns.

10. A data processing system according to claim 7, wherein said standard line determining means determines said standard line with a spline function.

11. A data processing system for a sewing machine, comprising:

a needle adapted to be moved upward and downward;

holding means for holding a material to be stitched; and means for causing a relative movement between said needle and said holding means in two axial directions intersecting each other in a horizontal plane, on the basis of a pattern data indicating a positional relationship therebetween, wherein the improvement comprises:

first memory means for storing a plurality of unit pattern data related to said relative movement for forming stitching patterns respectively and a plurality of polygonal fundamental block data relative to said stitching pattern, fundamental blocks determined by said plurality of polygonal fundamental block data containing said stitching pattern determined by said unit pattern data therein;

pattern selecting means for selecting unit pattern data from said first memory means;

second memory means for storing said selected unit pattern data;

manual designating means for designating a plurality of optional points on a desired curve and generating coordinate data related to said designated points;

standard line determining means for determining a standard line which passes through said designated points based on said coordinate data;

setting means for setting the starting points and end points of said fundamental blocks on said standard line on the basis of the fundamental data corresponding to the stitching pattern stored in said second memory means; and means for computing the angles, which segments joining said starting points and said end points form, and for rotating the individual ones of said pattern data.

12. A data processing system according to claim 11, wherein said setting means further comprises:
first means for using the end point of a preceding one of said fundamental blocks as the starting point of the present one and
second means for using said fundamental block data to select the end point on said standard line, at which distance to said fundamental block data from said starting point of the same is defined; and
third means for repeating said operations of said first and second means by the number of the fundamental blocks of the stitching pattern selected.

13. A data processing system according to claim 11, wherein said setting means includes: gap setting means for computing the distance from the terminal end of said standard line to the end point of the last one of said fundamental blocks and for dividing said distance to determine the divided distance as the gap between the individual ones of said fundamental blocks; and relocating means for finally relocating the starting points and end points of the fundamental block of each of said stitching patterns to be formed on the basis of the gap determined by said gap setting means, whereby said unit pattern data are computed on the basis of the starting points and end points finally relocated.

14. A data processing system according to claim 13, wherein said setting means determines said gap respectively related to said fundamental block data of said selected stitching pattern.

15. A data processing system according to claim 12, wherein said setting means determines the distance from the terminal end of said standard line to the end point of the last one of said fundamental blocks to compute an enlargement ratio on the basis of both said distance and the total sum of the fundamental data of all the stitching patterns to be formed, whereby the fundamental data of the respective ones of said fundamental blocks are enlarged on the basis of said enlargement ratio to finally regulate the starting points and end points set thereby to array the same over the total length of said standard line.

* * * * *